Aug. 16, 1932.  A. H. INGLIS ET AL  1,871,886
SOUND MEASURING SYSTEM
Filed May 6, 1931
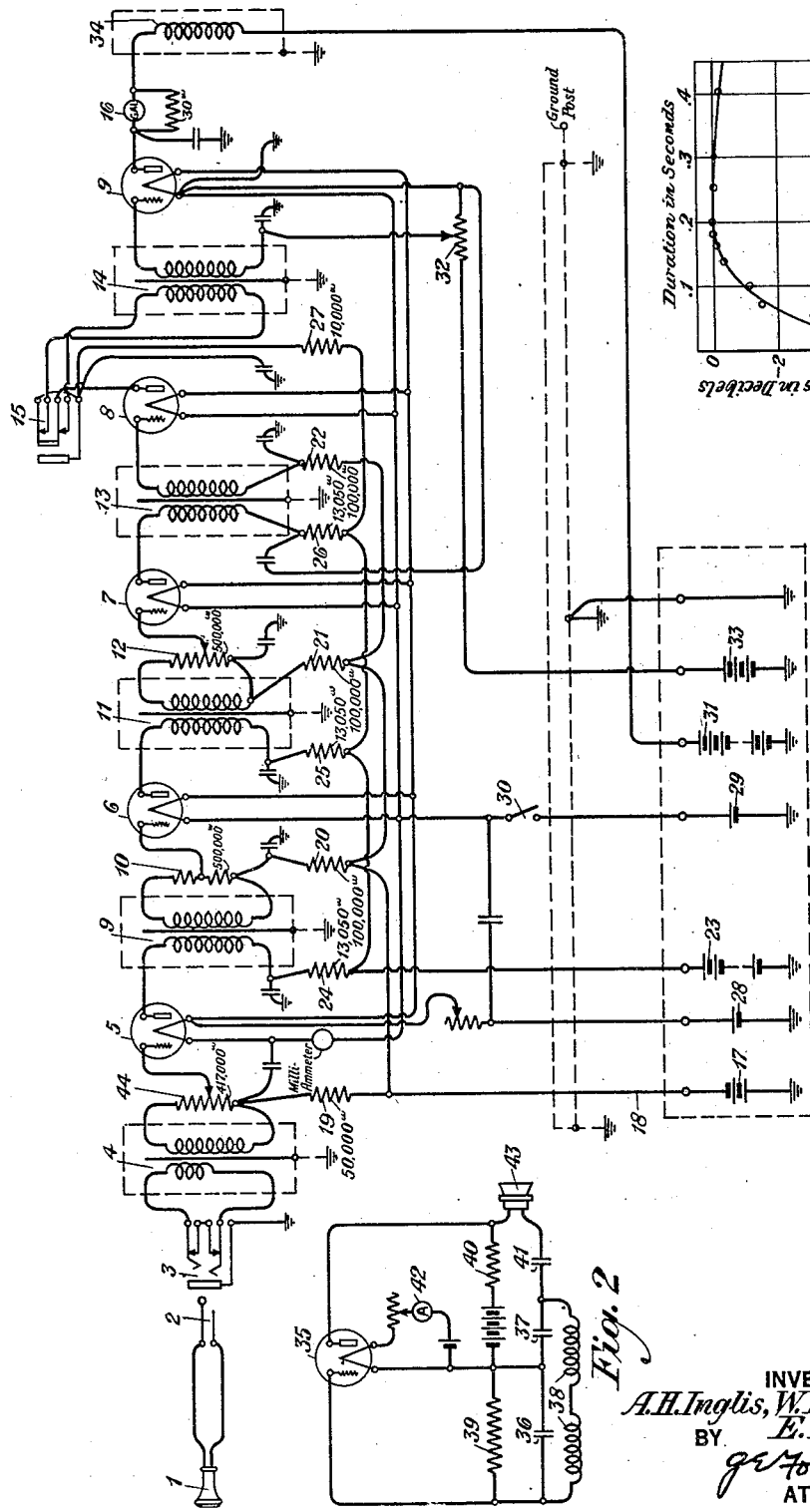
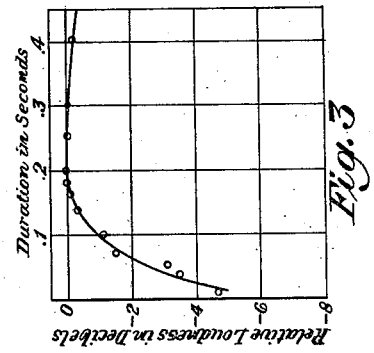
INVENTORS
A.H.Inglis, W.D.Goodale, Jr. and
E.Dietze
BY
ATTORNEY Patented Aug. 16, 1932

1,871,886

UNITED STATES PATENT OFFICE

ALFRED H. INGLIS, OF UPPER MONTCLAIR, WALTER D. GOODALE, JR., OF EAST ORANGE, AND EGINHARD DIETZE, OF WESTFIELD, NEW JERSEY, ASSIGNORS TO AMERICAN TELEPHONE AND TELEGRAPH COMPANY, A CORPORATION OF NEW YORK

SOUND MEASURING SYSTEM

Application filed May 6, 1931. Serial No. 535,514.

This invention relates to sound measuring devices, and more particularly to one characterized by the possession of an indicating device having substantially the same time constant as the human ear, and also characterized by the ability to adjust, according to frequency, the current resulting from a sound so that the effect of the said current upon the indicating device will be comparable to the effect of the same sound upon the human ear.

It is desirable for many reasons to be able to measure the intensity of sound, and various types of apparatus have been designed for that purpose. The apparatus heretofore used in measuring the intensity of room noise, to determine its effect upon telephone conversations, had the disadvantage that the measurements depended greatly upon the skill and the personal characteristics of the observer. Consequently, data obtained by the use of that apparatus, when made by different observers, were incapable of accurate comparison. One of the objects of the present invention is to eliminate the personality factor of the observer from the determination of the magnitude of the sound being measured.

Another object of the invention is to provide a visual indicating instrument having substantially the same time constant as the human ear.

A further object is to provide a system by which the various components of current, resulting from a given sound, which components correspond to different frequencies or bands of frequencies, may be weighted in a manner similar to that in which the human ear weights the components of sound impressed thereon.

Other objects of this invention will be apparent from the following description when read in connection with the attached drawing, of which Figure 1 shows diagrammatically the apparatus for amplifying and rectifying the currents resulting from a given sound, and also for weighting the components of that current and for indicating the magnitude of the current; Fig. 2 shows a calibrating device comprising an oscillator and a receiver for generating a sound of known intensity; and Fig. 3 is a graph showing the relative loudness of tones of short duration.

In Fig. 1 the transmitter 1 provides means for picking up the sound to be measured and for impressing it upon the measuring circuit. A preferred form of pickup device is a moving coil transmitter, inasmuch as it requires no additional battery supply, is somewhat more efficient, and has low impedance, thus permitting the use of long leads without danger of inductive interference. That transmitter is provided with a cord and plug 2, the latter being intended for insertion in the jack 3 of the measuring circuit. The contacts of the jack are coupled by the transformer 4 with the input of the vacuum tube 5 which includes a potentiometer 44. The potentiometer is designed and calibrated to give indications of 20 decibels between adjacent contact points. The tube 5 constitutes the first stage of a four-stage amplifier, the other tubes being designated 6, 7 and 8. Tubes 5 and 6 are coupled by the transformer 9; and the input circuit of tube 6 includes the potentiometer 10 that is designed and calibrated to give measurements of 2 decibels between adjacent contact points. Tubes 6 and 7 are coupled by means of the transformer 11; and the input circuit of tube 7 has a potentiometer 12. Tubes 7 and 8 are coupled by the transformer 13. The output circuit of tube 8 is connected with the input circuit of the rectifier tube 9 by means of the transformer 14. The said output circuit also includes a monitoring jack 15. The output circuit of the rectifier tube 9 contains a galvanometer 16 by which the magnitude of the rectified current may be indicated. That galvanometer has substantially the same time constants as the human ear, that is to say, it reaches its maximum steady value in about $\frac{2}{10}$ of a second. It is important also that the galvanometer be highly damped to prevent the needle swinging appreciably higher than the final reading. It is desirable to point out that all transformers and all of the apparatus comprising the measuring set are shielded. All shielded apparatus is grounded at one point.

The battery 17, which may be of the order of minus three volts, supplies the negative grid voltage over conductor 18 to the grids of the tubes 5, 6, 7 and 8. The connections to the grids include a plurality of resistances 19, 20, 21, 22 which serve as a resistance filter. The battery 23, which may be of the order of 45 volts, supplies the positive plate potential to the plates of the aforesaid tubes. Each of the plate connections includes one of the resistances 24, 25, 26 and 27 that serve as a resistance filter. On the drawing the magnitudes of the resistances have been shown. It is to be understood that the values given represent preferred magnitudes but it must not be understood that the invention is limited to those particular values indicated. The filaments of all tubes are energized by the batteries 28 and 29. The connection between those batteries and the filaments includes a switch 30. The latter batteries may be of the order of 1.5 volts each. The plate voltage of the rectifier is supplied by the battery 31 which may be of the order of 67½ volts, and the negative grid bias applied to the rectifier tube 9 is supplied by the drop in voltage through the resistance 32 of current flowing from the battery 33. The latter may be of the order of 9 volts.

In order to eliminate interference the conductors between the jack 3 and the primary winding of transformer 4 are shielded and connected to the common ground point. Likewise the grid conductor of tube 5 and also the plate conductor of tube 9 are shielded and grounded. Furthermore, the retardation coil 34 in the output circuit of the rectifier is shielded and grounded.

Before describing the manner in which the intensity of a sound is measured, we will describe briefly the method of calibrating the apparatus by measuring a sound of known intensity. Let it be assumed that a source of sound, for example, a loud speaker, is operating and that such sound is directed toward the receiver 1. Any convenient sound intensity may be used for calibration provided it has a known relation to a reference point. A satisfactory reference point is the sound intensity that produces a force of .001 dyne per square centimeter at 1000 cycles. That force or pressure is called the reference sound level and noise levels are expressed in decibels above that reference point. The intensity of the calibrating sound is determined by introducing a search tube into the field of sound emanating from the loud speaker. That sound will, of course, produce a current in the circuit of transmitter 1 which will be amplified by the multi-stage amplifier and when rectified by the tube will cause the needle of the galvanometer 16 to take a position corresponding to the strength of the current. The potentiometers 44 and 10 are adjusted so that the galvanometer needle will point to a definite mark on the scale, say that corresponding to the 30th division. Since the potentiometer 10 has been designed and calibrated to indicate differences of 2 decibels between adjacent contact points, and likewise, the potentiometer 44 indicates differences of 20 decibels between adjacent contact points, it will be apparent that when an unknown sound causes a deflection of the needle of the galvanometer 16 the needle may be brought back to the reference point on the scale by adjustment of the potentiometers 44 and 10, and the magnitude of the unknown sound above or below the reference standard will be directly indicated in decibels by the setting of the potentiometers.

It is important to point out that the amplifier is designed to weight the components of the current according to frequency in a manner similar to that by which the human ear weights an incoming sound, so that the indication given by the meter is comparable to the effect produced by the same sound on the human ear. As is well known, the ear is sensitive to sounds ranging from a few hundred cycles to 5000 cycles and that it is less sensitive to frequencies below 200 cycles and above 5000 cycles. In order to make the amplifier have that characteristic of the human ear the transformers have been designed to be relatively inefficient below 200 cycles and above 5000 cycles and to be efficient between those limits. That insures the weighting of the components of a current resulting from a given sound in the same manner in which that sound would be weighted when impressed upon the human ear.

As will be seen from Fig. 3, the effect of a given sound upon the human ear does not reach its maximum until that sound has persisted at least $\frac{2}{10}$ of a second. That is to say, if at a given instant two sounds of equal intensity were created, both audible, one persisting form $\frac{1}{10}$ of a second and the other for $\frac{2}{10}$ of a second, the effect upon the human ear would be such that the sound of longer duration would seem louder.

In order to adequately measure the intensity of sound by an indicating device, such device should have the same time constant as the human ear, that is to say, that the effect of a current resulting from a given sound should reach its maximum value in about $\frac{2}{10}$ of a second. As mentioned hereinbefore, the galvanometer 16 should be chosen to meet that requirement.

It is desirable to be able to check the accuracy of the measuring apparatus in the field before beginning the making of measurements. The making of such a check test is rendered possible by means of the oscillator circuit shown in Fig. 2. That circuit comprises a vacuum tube 35 having its input and output circuits coupled by the condensers 36 and 37 and the inductance 38. Those circuits also include the resistances 39 and 40 and the blocking condenser 41. The filament circuit includes a milliammeter 42 by means of which the filament current may be set at a predetermined value. The output circuit also includes a receiver 43 which produces a sound of known intensity at a given frequency e. g. about 2200 cycles. By adjusting the filament current at a predetermined magnitude and by placing the receiver 43 (which emits a tone of given intensity) in front of the transmitter 1 connected with the measuring set, an indication will be given by the galvanometer 16 of the measuring circuit. The intensity and frequency of the sound emitted by the receiver 43 should be as constant as possible, and the intensity of the sound relative to the reference sound level should be known. Then, if the needle of the galvanometer points to the same mark on the scale as it would have done if a sound of the same intensity were applied during calibration, the measuring apparatus is in proper order, provided, of course, that the filament current and the setting of the potentiometers 44 and 10 are same. If there is any deviation of the galvanometer needle it may be corrected by adjusting the potentiometer 12 connected with the input of the amplifier tube 7, and the apparatus is then ready for measuring sounds of unknown intensity. If the deviation is large it indicates that either the batteries or the tubes need replacement. After the adjustment just described has been made the set is then ready for the measurement of sound in the field, as described hereinbefore.

While the invention has been described particularly as applied to the measurement of room noise, it is capable of being used in other fields as, for example, the measurement of electric volume levels, and circuit noise.

Although the invention has been described as embodied in a particular form, it is to be understood that it is capable of embodiment in other and different forms without departing from the spirit and scope of the appended claims.

What is claimed is:

1. In a sound-measuring system, the combination with means to pick up sound and to convert it into an electrical current, of means to amplify the said current, the said amplifying means including means to render the transmission through said amplifier of the components of the said current corresponding to given frequencies or bands of frequencies in a manner simulating the transmission through the human ear of the sound waves impressed thereon, and means to rectify the amplified current and means to indicate the magnitude thereof, the said indicating means being capable of reaching its maximum value in substantially the same time required by a sound wave to produce its maximum effect upon the human ear.

2. The combination with a system of the character set forth in claim 1, together with means to calibrate the said measuring system, the calibrating means including a device for producing sound vibrations of known intensity and frequencies, which vibrations are impressed upon the pick-up means of the sound-measuring system.

3. The method of measuring the intensity of sound, which consists in picking up the sound and converting it into an electrical current, amplifying the said current and controlling the degree of amplification given to the several frequency components of said current so that its indicated effect will be similar to the effect produced by sound waves upon the human ear, rectifying the amplified current, and measuring the magnitude thereof.

4. The method of measuring the intensity of sound, which consists in picking up the sound and converting it into an electrical current, amplifying the said current and controlling the degree of amplification given to the several frequency components of said current so that its indicated effect will be similar to the effect produced by sound waves upon the human ear, rectifying the amplified current, measuring the magnitude thereof, and adjusting the measuring means so that it will have substantially the same time constant as the human ear.

5. In a measuring system, the combination with an amplifier, having means connected therewith to render the transmission of waves of different frequencies through said amplifier in the same proportions as the corresponding frequencies are transmitted through the human ear, and measuring means so connected to said amplifier that the amplified waves will be impressed thereon, the said measuring means having the same time constant as the human ear.

In testimony whereof, we have signed our names to this specification this 5th day of May, 1931.

ALFRED H. INGLIS.
WALTER D. GOODALE, Jr.
EGINHARD DIETZE.